United States Patent Office
3,520,482
Patented July 14, 1970

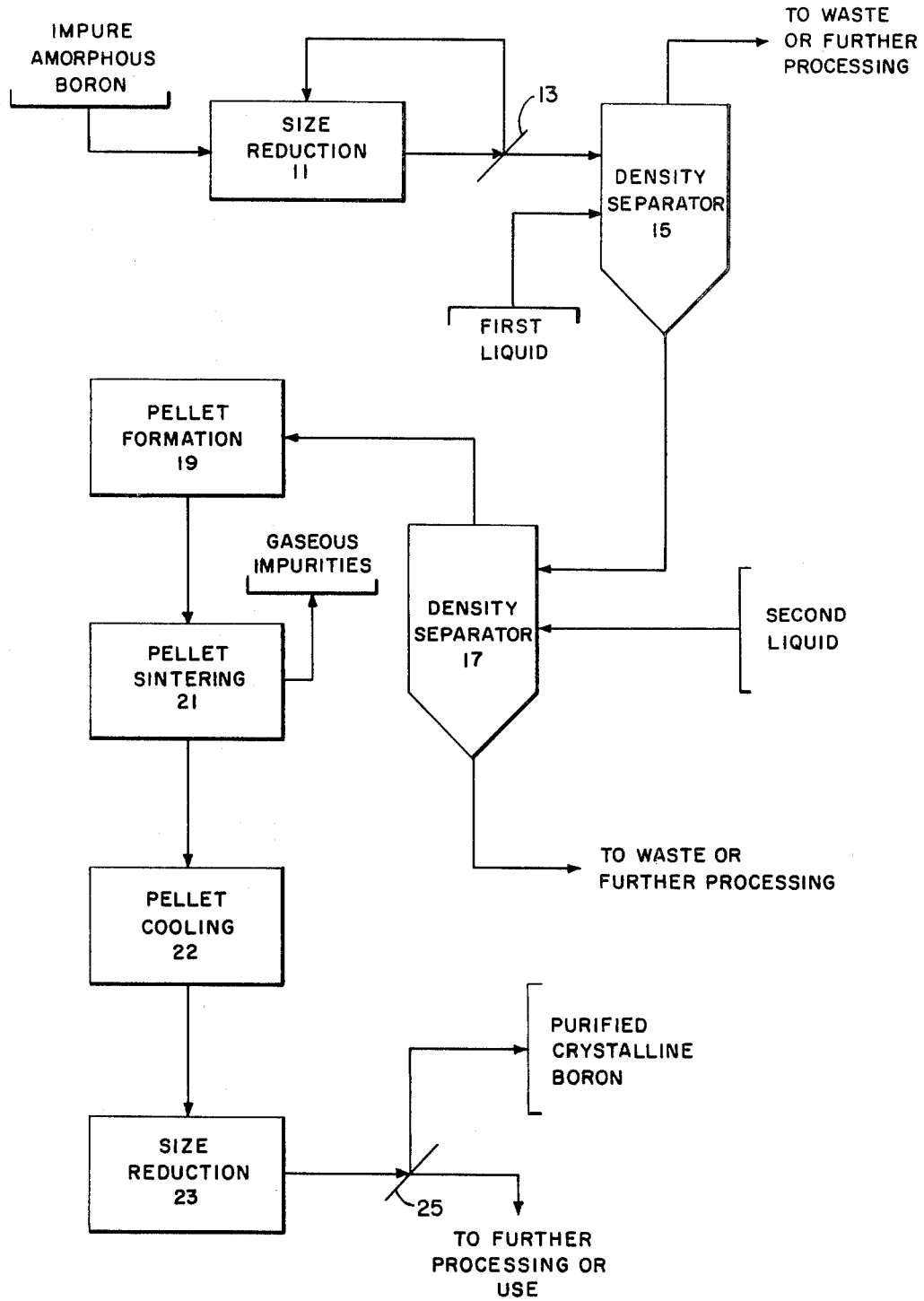

3,520,482
PREPARATION AND PURIFICATION OF CRYSTALLINE BORON
Michael J. Savitski, Dayton, Ohio, assignor to the United States of America as represented by the United States Atomic Energy Commission
Filed Sept. 11, 1968, Ser. No. 758,936
Int. Cl. B02c 19/00, 21/00
U.S. Cl. 241—3
10 Claims

ABSTRACT OF THE DISCLOSURE

A process for producing crystalline boron comprising milling contaminated amorphous boron into a particulate mixture, segregating a density fraction having a higher boron purity than the aggregate, pelletizing such particulate density fraction, sintering the pellets to vaporize peripheral impurities while concentrating residual impurities to the pellet core, crushing the cooled pellets until about half thereof passes through a fine mesh screen, and recovering the high purity fraction which remains on the screen.

BACKGROUND OF INVENTION

Commercially available elemental boron obtained from the electrolytic boron-10 enrichment process and from other sources may contain a number of impurities including carbon, copper, nickel, iron, silicon, calcium, potassium, sodium, lead, titanium, magnesium, chromium, manganese, oxygen and others. The concentration of each impurity constituent may vary from less than 0.001 weight percent to in excess of 4.0%. The boron-10 enriched material may have a purity of about 93% by weight whereas boron of natural isotopic composition may have a purity of about 87% by weight. There are many applications which require boron of high purity in the nuclear sciences and other fields making it desirable to remove most if not all of these impurities.

Crystalline boron is less reactive than amorphous boron which makes the crystalline form desirable where impurities could be introduced by reaction. It has been found through use of X-ray diffraction techniques that amorphous boron may actually comprise numerous tiny crystals of boron so randomly dispersed that the material assumes amorphous characteristics. Hence, the term "amorphous" shall be used in this application to refer to either or both the non-crystalline and the small, randomly dispersed crystal states whichever in actuality exists.

High purity boron has use in nuclear reactors to absorb thermal neutrons, in neutron sources, and ionization chambers or neutron counters. As a thermal neutron absorbing agent boron-10 may capture a neutron to form boron-11 in an excited state which decomposes into lithium-7 and an alpha particle. Impurities in boron may dilute or have unpredictable effects on its neutron absorbent characteristics. As a neutron source, boron-10 or boron-11 may react with an alpha particle to form nitrogen-13 or nitrogen-14 and thereafter emit a neutron. Impurities may interfere with incident alpha particles or produce other undesirable effects. Ionization chambers and neutron counters may be filled with such as boron trifluoride gas. Impurities such as silicon fluoride intermixed with the boron fluoride gas may give rise to a spurious count.

SUMMARY OF INVENTION

It is therefore an object of this invention to provide a process for producing purified crystalline boron.

It is a further object of this invention to provide a method of producing boron in excess of 99% by weight purity.

Various other objects and advantages will appear from the following description of one embodiment of the invention.

The invention is a method of purifying and preparing crystalline boron comprising crushing and classifying impure boron to provide a small particle size, segregating an intermediate density fraction which has a higher boron purity than the composite, pressing the intermediate fraction into pellets, heating the pellets to volatilize a portion of the impurities and to transpose further impurities into the pellet core, and crushing followed by screening of the pellets to pulverize the impure frangible cores while recovering the more durable and purer pellet shells among the larger particle sizes.

DESCRIPTION OF DRAWING

The drawing is a flow diagram illustrating one form of the method of the present invention.

DETAILED DESCRIPTION

Referring to the drawing, a feed mixture of elemental boron including boron-10 and other boron isotopes with impurities may be crushed or ground to a fine particulate mixture with suitable size reduction means 11, such as a mortar and pestle or ball mill. The resulting powder may be screened with a small aperture screen 13 such as about a 120 U.S. standard mesh screen, or otherwise suitably graded or classified by size to insure that only particles of a desired small size pass to the subsequent density separation. For 120 U.S. standard mesh, the maximum particle diameter which passes screen 13 is about 125 microns in diameter. In some instances the particles which initially pass through the screen 13 may be of low boron purity and may be discarded or separately processed to increase boron concentration. Oversize particles may be returned or recycled to the size reduction means 11 for further crushing.

The powder may next be classified according to density to segregate an intermediate density fraction of particles falling within a desired density range at about or within 2.1 to 2.4 grams per cubic centimeter. Generally, boron-10 enriched boron has a density of about 2.16 to 2.32 grams per cubic centimeter while natural boron has a density of about 2.33 to 2.37 grams per cubic centimeter. Particles having a density above the selected range may contain or be highly contaminated with such as nickel, copper, iron, manganese, cobalt, aluminum, etc., while particles falling below the range may contain relatively large quantities of such as carbon, calcium, magnesium, silicon, etc. An optimum density range may be empirically determined which will include particles of higher boron purity than particles outside such range. The optimum density range may vary with the character of the feed material, for instance with the proportion of boron-10 to other boron isotopes and the type contaminants present. The powder particle size may also affect the optimum density range and the effectiveness or recovery of the density separation. It has been found that about 86 percent by weight of the powder may be recovered in a density range of higher boron purity than the feed if the starting material is all below about 120 U.S. standard mesh particle size.

The segregation by density may be performed by preparing a first liquid having a density defining the lower end of the desired density range. Liquids such as chloroform (about 1.49 grams per cubic centimeter) and tetrabromoethane (about 2.94 grams per cubic centimeter) may be mixed in proper proportion or used separately to attain the exact density desired. Fine density adjustments may be accomplished through temperature variation and control of the liquid. The powder and liquid may be mixed and processed in a suitable density separator 15 such that particles having a density less than that of the liquid and accordingly outside the desired density range may be removed, while particles having a density greater than that of the liquid may be recovered. The density separator 15 may be a conventional centrifuge such as a laboratory or clinical model, or if large volumes are required to be processed, a continuous flow, bowl type centrifuge. A somewhat slower and less effective separation may be obtained by mixing the powder and liquid together in a column and allowing the lighter particles to rise and the denser particles to settle.

The particles having a density greater than that of the first liquid may be allowed to drain and transferred to a second density separator 17 similar or identical to the first separator 15. These particles may be mixed with a second liquid prepared similarly to the first liquid and having a density defining the high end of the desired density range. An intermediate density fraction of particles having a density less than that of the second liquid, and accordingly within the desired density range, may be centrifugally or otherwise separated from the second liquid within separator 17 in like manner to the previous density separation.

It should be clear that the two density separations may be preformed in reverse order to that set forth. Furthermore, the separation may be performed in a single step if suitable liquids and equipment can be provided. For instance a centrifuge adapted to separate feed into a light, intermediate, and heavy stream could be fed with a mixture of the boron powder and two immiscible liquids which define the desired density range. Alternatively, a settling or density gradient column may be prepared with the powdered boron and the two liquids which may be either immiscible or carefully combined. Particles having the desired density will thereafter accumulate at the interface between the liquids or at some level within the liquids.

Particles having a density outside the desired range may constitute about 14 percent of the feed material or powder. This rejected fraction may be discarded or upgraded in boron concentration by a sintering, crushing, and screening method similar to that which will be presently set forth for processing the intermediate fraction of particles within the desired density range. After upgrading the boron purity, this rejected fraction may be recycled to the density separation step for further processing.

The intermediate fraction of particles within the desired density range may be rinsed or washed with benzene or other suitable liquid or solvent to remove the liquids used in the density separation. Boron purities of about 95 to 98 percent may be achieved within the intermediate fraction of particles. These particles may then be pressed or pelletized into pellets or pills in a suitable pellet forming means 19 such as a pellet mill or press and extrusion die operated at about 5000 p.s.i. Small size pellets of less than about one inch diameter and two grams weight are preferable to facilitate the following volatilization of impurities.

The pellets may subsequently be placed in a suitable sintering means 21 such as a vacuum furnace or oven, which may be evacuated to about $1 \times 10^{-4}$ to $4 \times 10^{-4}$ torr absolute pressure and maintained there during the sintering operation. The temperature of the furnace and the pellets therein may then be raised to about 200–500° C. and held there for about 10 minutes to volatilize surface impurities such as lubricating oil which may have been absorbed from the pellet press. Next the temperature may be raised rapidly but at a rate sufficiently low to prevent fracture or cracking of the pellets, such as about 30° C. to 70° C. per minute. The heating rate required may vary as the composition and character of the feed material changes. The pellets may be heated to a sintering temperature within about 20° C. or less of the melting point of boron. Pure boron melts at about 2030° C. but impurities may alter the melting point so that tests may be carried out on each batch of pellets to ascertain their melting point. The pellets may be maintained at the sintering temperature under vacuum for about 2 to 3 minutes while further impurities are vaporized primarily from the pellet shell regions and other impurities begin to migrate towards the core of the pellet. It is preferable that the pellets not be heated at the sintering temperature for any period of time beyond that set forth since boron has a high vapor pressure at this temperature. It is during this sintering step that the boron begins to change or appear to change from the amorphous to the crystalline form. At temperatures about 10° C. to 20° C. below the melting point, the small randomly dispersed crystals present in the amorphous form may begin to grow and emulate this amorphous to crystalline transition.

The pellets may then be cooled 22 at a suitable rate sufficiently slow to prevent cracking preferably about 85° C. or less per minute. However, cooling rates as high as about 300° C. per minute may be employed with a greater risk of cracking. As cooling begins the core of the pellet is believed to be in a near liquid state with a high affinity for impurities. As the pellet shell cools and hardens, impurities are believed to migrate into the more liquid core region leaving the pellet shell relatively pure. Consequently, the core may become more frangible on cooling than the pellet shell which facilitates the following crushing and screening purification and separation.

After cooling, the pellets may be crushed in a suitable size reduction means 23 which may be similar or identical to size reduction means 11. The pellets may be crushed with just enough force to comminute the frangible pellet core portions to a small size while breaking the durable shell portions into larger size particles. The crushing may take place between boron carbide or other boron surfaces to minimize contamination.

The crushed pellets may be separated into two-size fractions with suitable size classification means 25 such as a screen or sieve so that the larger sized particles may comprise a predominance of the high boron purity pellet shells. It has been found that an effective separation and purification of boron may be made when about one-half of the pellet material passes through a small aperture screen such as about a 40 or 60 U.S. standard mesh screen (other screen sizes may also be satisfactory) leaving the purified, larger particles on the screen. A higher boron purity material may be obtained by recrushing the material remaining on the screen and rescreening through the same or a smaller aperture screen. Again the higher purity material will remain on the screen. Alternatively, additional purified material may be obtained by recrushing and rescreening the initial smaller size fraction through a second screen having smaller apertures than the first. The material remaining on the second screen may have a higher purity than the material passing through and provide suitably pure boron for some purposes. The recrushing and rescreening of either the larger or smaller sized fractions may be performed as many times as desired or until the degree of purification resulting therefrom becomes minimal. Optimum separation may be obtained if each successive crushing step is continued until about one-half by weight of the material will pass through the next screen. However, a smaller quantity of higher purity material may be made to remain on a particular screen if additional crushing is employed. If desired, the larger sized fractions off the in process or intermediate screens may be combined with new material or material passing through a size larger screen prior to crushing to establish a continuous flow process.

The fifty percent or other fraction of the material which does not pass through a particular screen is the purer fraction and may be retained as product. Further purification may be obtained by vacuum reheating of the product or by a complete recycle of pelletizing, sintering and crushing. The less pure fraction which passes through a particular screen may be of satisfactory purity for some purposes or it may be returned to the pellet mill or furnace for reprocessing and upgrading.

The various fractions may be crushed to any desired particle size after separation depending on the particular application of the purified boron such as to less than about 140 U.S. standard mesh.

EXAMPLE 1

Feed material which has been preliminarily enriched to about 92 percent boron-10 and about 1% other boron isotopes, both of amorphous state, is crushed with a boron carbide mortar and pestle (other size reduction equipment may be used) to a particle size less than about 120 U.S. standard mesh. The crushed boron material is placed in a clinical type centrifuge along with the organic liquids chloroform and tetrabromoethane mixed in proportion to produce an organic solution having a density of about 2.16 grams per cubic centimeter. The resulting mixture is centrifuged and particles having a density below about 2.16 grams per cubic centimeter rise to the surface and are removed from the process. The remaining particles having a density above about 2.16 grams per cubic centimeter are transfered to a second organic liquid solution of chloroform and tetrabromoethane having a density of about 2.32 grams per cubic centimeter and again centrifuged. Particles in the density range of 2.16 to 2.32 grams per cubic centimeter float to the surface and thereafter are removed and washed with benzene.

The intermediate fraction of boron particles, which are in the desired density range of 2.16 to 2.32 grams per cubic centimeter, are found to be about 97.4 percent boron. These particles are then pelletized to about ¾ inch diameter, ⅜ inch long pellets weighing about 1.5 grams each at a press load of about 5000 p.s.i. and placed in a vacuum furnace evacuated to about $2 \times 10^{-4}$ torr. The pellets are first heated to about 300° C. for about 10 minutes followed by a heating rate of about 58° C. per minute until a temperature of about 2030° C. is reached. This temperature is within about 20° C. of the melting point of the pellets, previously found to be about 2050° C. The peak temperature is held for about 3 minutes and then the furnace cooled to ambient temperature at a rate not exceeding about 85° C. per minute while the vacuum is maintained.

The cooled pellets are then lightly crushed or milled between a boron carbide mortar and pestle and the larger and smaller particles separated with about a 40 U.S. standard mesh screen. Then both screen fractions are again lightly milled with a mortar and pestle followed by separately screening the larger and smaller fractions through about a 60 U.S. standard mesh screen to provide four fractions of about equal weight with the material remaining on the 60 mesh screen having the highest purity. These fractions are available for separating use or recombination in any manner depending on the purity requirements.

EXAMPLE 2

The method used in Example 1 is followed except that the pellets are only subjected to a single crushing step followed by screen through a 40 U.S. standard mesh screen. The material falling through the screen has a boron concentration of about 98.7 weight percent and is recycled to the pellet press for further processing. The material remaining on the screen has a crystalline boron concentration of about 99.45 weight percent and is retained as product.

EXAMPLE 3

A natural isotopic composition comprising about 18 weight percent amorphous boron-10, about 69 weight percent other amorphous boron isotopes, and more than 4 weight percent magnesium is crushed with a mortar and pestle to a particle size less than about 120 U.S. standard mesh. The crushed material is separated in two centrifuge steps as in Example 1 to provide intermediate fraction particles of about 95.5 percent boron within a desired density range of about 2.33 to 2.37 grams per cubic centimeter. The boron particles within this desired density range are pelletized and heated first to about 300° C. for about 10 minutes and then heated to about 2000° C. under vacuum in about 55 minutes. The pellets are held at 2000° C., which is about 20° C. below the pellets' melting point for about 2 minutes followed by cooling to room temperature in about 6.5 minutes. The sintered boron pellets are then crushed and sieved through a 40 U.S. standard mesh screen followed by recrushing and screening only the larger than 40 mesh fraction through a 60 U.S. standard mesh screen. The smaller fractions are recycled to the pellet press for further purification. While the material remaining on the 60 mesh screen is retained as product.

EXAMPLE 4

The method of Example 3 is followed except that only the smaller than 40 mesh fraction is recrushed and screened through a 60 mesh screen. The larger than 60 mesh fraction is combined with the larger than 40 mesh fraction and retained as product. The smaller than 60 mesh fraction having the lowest boron purity is returned to the pellet press for further processing.

The method of this invention provides a process for crystallizing and highly purifying boron in a single process. It may be used with natural boron as well as boron having an enriched boron-10 isotopic composition. Yields as high as 85 to 88 percent by weight of the boron in the feed may be recovered at better than about 98.5 percent by weight boron product. Purities as high as 99.5 percent by weight boron have been obtained. The method does not require melting of the boron material and may be performed with ordinary plant or laboratory equipment.

It will be understood that various changes may be made by those skilled in the art to the details, materials and arrangement of the steps described to explain the nature of the invention within the scope of the appended claims.

What is claimed is:

1. A method of producing high purity crystalline boron from impure amorphous boron comprising crushing said impure boron to particles, submerging said particles in a first liquid having a first density, supporting said particles on a second liquid having a second density which exceeds said first density to segregate an intermediate density fraction of particles having densities between said first and second densities, forming said intermediate density fraction of particles into pellets, sintering said pellets at elevated temperatures to remove gaseous impurities, cooling said pellets to ambient temperature, crushing said pellets to form a particulate mixture including varying particle sizes, and screening said mixture to provide a larger particle size fraction of high purity boron and a smaller particle size fraction of lower boron purity.

2. The method of claim 1 wherein said steps of submerging and supporting particles comprises the combination of centrifuging said particles with a first mixture of chloroform and tetrabromoethane, and centrifuging a portion of said particles with a second mixture of chloroform and tetrabromoethane to provide said intermediate density fraction of particles.

3. The method of claim 1 wherein said pellets have a diameter of not more than about one inch and a weight of not more than about two grams.

4. The method of claim 1 wherein said sintering comprises maintaining said pellets at an absolute pressure of $1 \times 10^{-4}$ to $4 \times 10^{-4}$ torr while heating said pellets to an initial sintering temperature substantially below their melting point, maintaining said initial sintering temperature for about 10 minutes, thereafter heating said pellets to a second sintering temperature within about 10° C. to 20° C. of their melting point, and maintaining said second sintering temperature for about 2 to 3 minutes, and said cooling step comprises reducing the pellet temperature at a rate not exceeding 85° C. per minute.

5. The method of claim 1 wherein said pellet crushing and screening is continued until about one-half by weight of said resulting particulate mixture passes into said smaller particle size fraction.

6. The method of claim 1 in combination with re-crushing said larger particle size fraction followed by rescreening said fraction to provide new larger and smaller particle size fractions having differing boron purity.

7. The method of claim 1 in combination with re-crushing said smaller particle size fraction followed by rescreening said fraction to provide new larger and smaller particle size fractions having differing boron purity.

8. The method of claim 1 in combination with repelletizing and resintering said screened fractions to further remove impurities.

9. The method according to claim 1 wherein said impure amorphous boron comprises enriched boron-10, said first density is about 2.16 grams per cubic centimeter, and said second density is about 2.32 grams per cubic centimeter.

10. The method according to claim 1 wherein said impure amorphous boron comprises a natural isotopic composition, said first density is about 2.33 grams per cubic centimeter, and said second density is about 2.37 grams per cubic centimeter.

References Cited

UNITED STATES PATENTS

| | | | |
|---|---|---|---|
| 2,739,895 | 3/1956 | Varney | 241—3 X |
| 3,135,473 | 6/1964 | Schrader | 241—3 |
| 3,152,201 | 10/1964 | Kumnick | 241—3 |
| 3,252,842 | 5/1966 | Williams | 241—16 X |

ROBERT C. RIORDON, Primary Examiner

D. G. KELLY, Assistant Examiner

U.S. Cl. X.R.

241—17, 20, 29